(12) United States Patent
Khan et al.

(10) Patent No.: US 8,718,440 B2
(45) Date of Patent: May 6, 2014

(54) DECENTRALIZED SYMMETRIC NETWORK OF AUTONOMOUS DIGITAL VIDEO RECORDERS AND ITS METHOD OF USE

(75) Inventors: Mohammad Ayub Khan, Santa Clara, CA (US); Mushtaq Ahmad Mughal, Islamabad (PK); Adnan Obaid, Islamabad (PK); Haris Sarwar, Islamabad (PK); Yousra Yousaf Alvi, Islamabad (PK); Haroon Ur Rashid, Islamabad (PK); Atif Raza, Islamabad (PK)

(73) Assignee: Streaming Networks, Inc., Santa Clara, CA (US)

( * ) Notice: Subject to any disclaimer, the term of this patent is extended or adjusted under 35 U.S.C. 154(b) by 250 days.

(21) Appl. No.: 13/053,230

(22) Filed: Mar. 22, 2011

(65) Prior Publication Data

US 2011/0229105 A1    Sep. 22, 2011

Related U.S. Application Data

(60) Provisional application No. 61/340,801, filed on Mar. 22, 2010.

(51) Int. Cl.
*H04N 5/932* (2006.01)
(52) U.S. Cl.
USPC .......................................... 386/219; 386/200
(58) Field of Classification Search
None
See application file for complete search history.

(56) References Cited

U.S. PATENT DOCUMENTS

| | | | |
|---|---|---|---|
| 2005/0066371 A1* | 3/2005 | Lu | 725/105 |
| 2005/0197818 A1* | 9/2005 | Monfared et al. | 703/21 |
| 2008/0198231 A1* | 8/2008 | Ozdemir et al. | 348/159 |
| 2010/0135643 A1* | 6/2010 | Fleming | 386/117 |

\* cited by examiner

*Primary Examiner* — William C Vaughn, Jr.
*Assistant Examiner* — Eileen Adams
(74) *Attorney, Agent, or Firm* — Firasat Ali; Creso Legal

(57) ABSTRACT

The present invention describes a decentralized symmetric configuration of digital video recorders (DVCRs) for monitoring, controlling, analyzing, recording, playback and streaming of audio/visual (A/V) media over a network. Each DVCR is an autonomous device able to operate in its local environment as well as access and operate another DVCR available on the network to facilitate the overall working of the disclosed system. Each DVCR also exhibits storage failsafe feature whereby it recovers data automatically if storage media gets corrupted such as due to sudden power failure. A DVCR can be configured to scan the network for other DVCR units. A list of discovered DVCRs is displayed. Each DVCR can access, after authentication, any of the listed DVCR for configuration, monitoring, controlling, recording, playback and other available functionality over the network. The same controls used for operating a local DVCR, including use of buttons, can be employed to operate the remote DVCR, giving a virtual presence at the remote location. The functionality exhibited by each of the DVCR, can be identical. A plurality of the DVCR can thus form a decentralized, symmetric network in which there is no master or central controller.

10 Claims, 9 Drawing Sheets

| Name | IP address | Status |
|---|---|---|
| DVCR 231 | 192.168.5.231 | Recording |
| DVCR 232 | 192.168.5.232 | Idle |
| DVCR 237 | 192.168.5.237 | Idle |
| DVCR 241 | 192.168.5.241 | Connected |

DECENTRALIZED SYMMETRIC NETWORK OF AUTONOMOUS DIGITAL VIDEO RECORDERS AND ITS METHOD OF USE

CROSS REFERENCE TO RELATED APPLICATIONS

This application claims the priority benefit of U.S. Provisional Application No. 61/340,801 entitled "Decentralized Symmetric Network of Autonomous Digital Video Recorders And Its Method of Use," filed on 22 Mar. 2010, this is incorporated herein by reference.

TECHNICAL FIELD

The present invention generally relates to digital video recorders and players. More specifically, the present invention is in the technical field of network enabled digital video recorders and players.

BACKGROUND

Existing digital video recorders allow recording of video in a digital format onto a device such as USB memory drive, disk drive, or other memory mediums. A limitation with the existing video recorders is that they are dependent on operated through a computer and operate as silos or individual and separate units and unable to communicate with other digital video recorders.

SUMMARY

A decentralized symmetric system for monitoring, controlling, analyzing, recording, playback and streaming of multimedia data including audiovisual (A/V) over a network is disclosed. The network can be a single network or a combination of different networks each being wired or wireless. The network can be a computer network, cellular network, packet switched network, and circuit switched network or any combination thereof.

In one embodiment, the disclosed system consists of a plurality of network enabled digital video recording apparatus connected to the network in wired or wireless manner. The digital video recording apparatus is a standalone device that besides recording multimedia data can monitor, control, playback, analyze and stream A/V data. The disclosed apparatus is hereafter referred to as Digital VCR (DVCR) and the reason for the naming is alluded to later on in the document.

A DVCR can scan a network to locate other DVCR units. Each DVCR can access, after authentication, any of the discovered DVCR over the network, for configuration, monitoring, recording, playback and other available functionality. The same controls used for operating a local DVCR, including through buttons and switches, can be used to operate a remote DVCR, giving a virtual presence at the remote location. A general purpose computer can also access a remote DVCR over a network.

The functionality exhibited by each of the DVCR, can be identical. A plurality of DVCR can thus form a decentralized, symmetric network in which there are no master and slave nodes. Each DVCR is an autonomous device able to operate in its local environment as well as access and operate another DVCR available on the network to facilitate the overall working of the disclosed system.

The A/V input sources to a DVCR unit can be analog and/or digital including an IP camera. A DVCR can process and encode/decode/transcode the input video and audio in a number of formats including video as MJPEG, H.264 and audio as MP3. It can multiplex/demultiplex the compressed audio and video stream using a number of formats including transport stream (TS). The multiplexed stream can be transmitted/received using a number of streaming protocols including HTTP, RTSP and RTMP. A DVCR can also simultaneously record and stream A/V data. Other data such as position data, associated with the A/V recording, from a GPS device can also be received and stored in appropriate format. A DVCR can have local storage, shared network storage (for example NAS drive) or no storage when monitoring only. The local storage can be a fixed type (for example, internal hard disk) and/or removable type such as USB based storage devices attached to one or more USB interface of a DVCR. A fail-safe feature of DVCR keeps any data loss to a minimum by periodically flushing the recorded data to the storage. Also, it is able to repair the file system and data area of the storage in case of corruption due to sudden disturbance such as power failure. A DVCR can playback recorded files with trick modes that include pause, reverse play, fast forward/rewind. All the trick modes are also available when playing prerecorded files, over a network, from local storage of a remote DVCR. The DVCR player also has smart search and retrieval capability to locate data with reference to a particular period in time or event. For this purpose, each A/V recording has an associated database file which consists of number of fields about the A/V file including all the events and time related information. A DVCR can be configured via a graphical user interface allowing recorder and player settings, network and other connectivity selection and video and audio analytic thresholds and parameter settings. A DVCR can have multiple network interfaces and can be configured in switch or router mode. An analog and IP camera can be attached to DVCR simultaneously and operated via the DVCR user interface locally or over a network. The IP camera while attached to DVCR can also be accessed by its own web application over a network in a transparent manner.

The applications of the disclosed system include security and surveillance, entertainment, education, training and other similar domains. The symmetry and decentralized characteristic of the disclosed system brings ease of use and deployment advantages. A DVCR node can be added or removed without affecting the working of an existing network. Incremental expansion to the existing network is accomplished in a simple manner. The system can be easily installed and managed, requiring no special skills or dedicated personal. The DVCR can be moved conveniently from one location to another, requiring a simple plug-in to an existing network. It can be placed indoors or outdoors. Examples of locations where the disclosed surveillance system can be installed include franchises, departmental stores, media server rooms, block of apartments, homes and offices, vehicles, road crossings for traffic monitoring etc.

It is understood that other embodiments of the present invention will become readily apparent to those skilled in the art from the following detailed description, wherein various embodiments of the invention are shown and described by way of illustration. As will be realized, the invention is capable of other and different embodiments and its several details are capable of modification in various other respects, all without departing from the spirit and scope of the present invention. Accordingly, the drawings and detailed description are to be regarded as illustrative in nature and not as restrictive.

BRIEF DESCRIPTION OF THE DRAWINGS

Aspects of the present invention are illustrated by way of example, and not by way of limitation, in the accompanying drawings, wherein.

DETAILED DESCRIPTION

The detailed description set forth below in connection with the appended drawings is intended as a description of various embodiments of the present invention and is not intended to represent the only embodiments in which the present invention may be practiced. The detailed description includes specific details for the purpose of providing a thorough understanding of the present invention. However, it will be apparent to those skilled in the art that the present invention may be practiced without these specific details. In some instances, well-known structures and components are shown in block diagram form in order to avoid obscuring the concepts of the present invention.

One or more embodiments of the present invention will now be described. In one embodiment, the present invention consists of a system of one or plurality of the autonomous digital video recording apparatus (DVCR). Each DVCR is capable of monitoring, controlling, recording, playback, analysis and streaming of audio/visual (A/V) media over a network. In one embodiment, a decentralized symmetric surveillance system comprising of plurality of DVCR is disclosed. The invention is presented using a security and surveillance application but it is by no means the only application of the disclosed system. The system can be usefully deployed in other domains as well such as entertainment, education, training to name a few.

Figure 1:
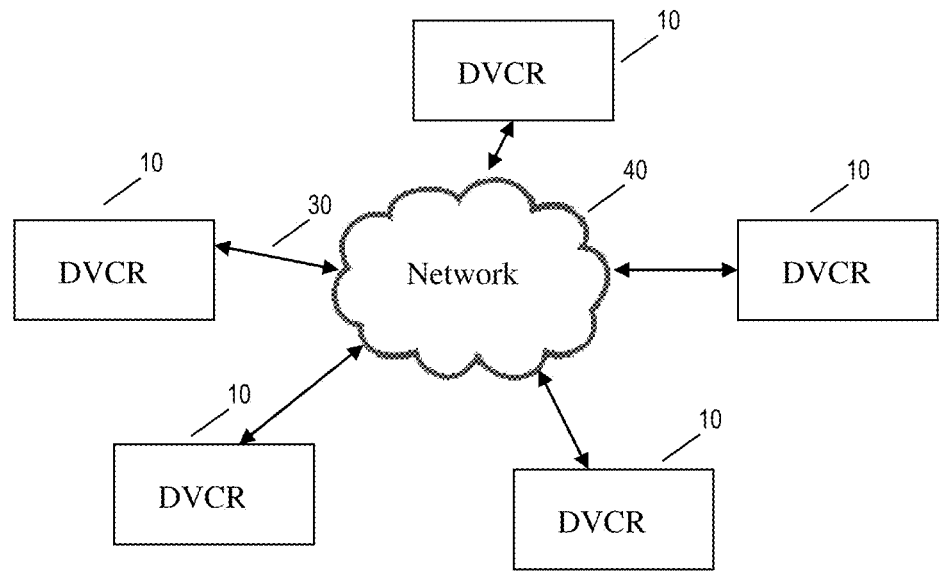
FIG. 1 is a simplified diagram illustrating one embodiment of the present invention.

Referring now to the invention in more detail, in one embodiment as shown in FIG. 1, the disclosed system comprises of one or plurality of DVCR 10 nodes interconnected via a communication network 40 and links 30. The link 30 between a DVCR 10 and network 40 can be of a wired or wireless connection or any combination thereof. The network 40 can be a single network (for example, a router or switch) or a combination of different networks each being wired or wireless. The network 40 can be a computer network, cellular network, packet switched network, circuit switched network, or combination of such networks thereof. The network 40 can encompass a local area network (LAN), a municipal area network (MAN), a wide area network (WAN), virtual private network (VPN) or any other type of network that joins multiple locations where DVCR 10 are in deployment.

Figure 2:
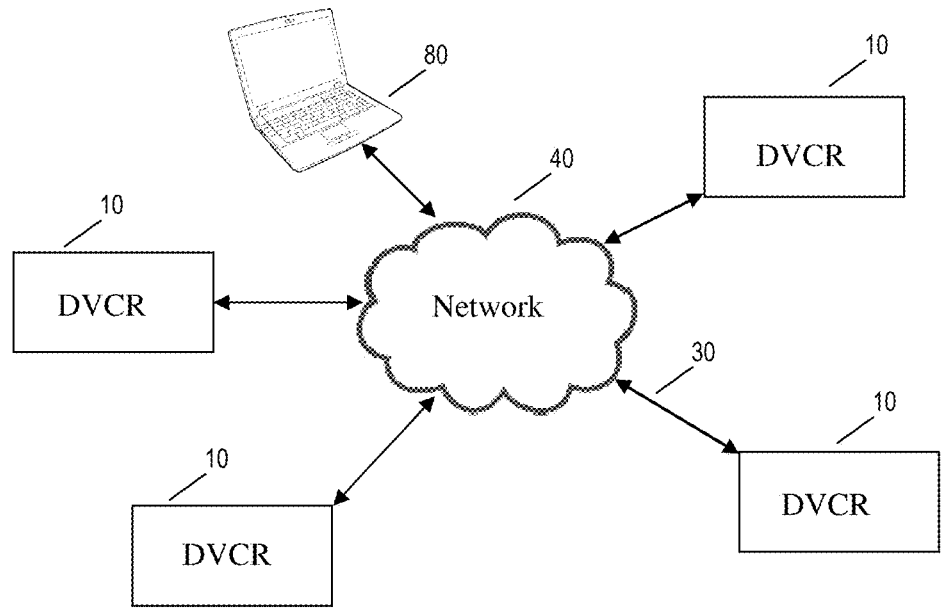
FIG. 2 is a simplified diagram illustrating another embodiment of the present invention.

In another embodiment of the invention, as shown in FIG. 2, along with one or more DVCR 10, one or more general purpose computer 80 may also be connected to the network 40 via links 30. The computer 80 can be used to access and manage remote DVCRs over the network.

Figure 3:
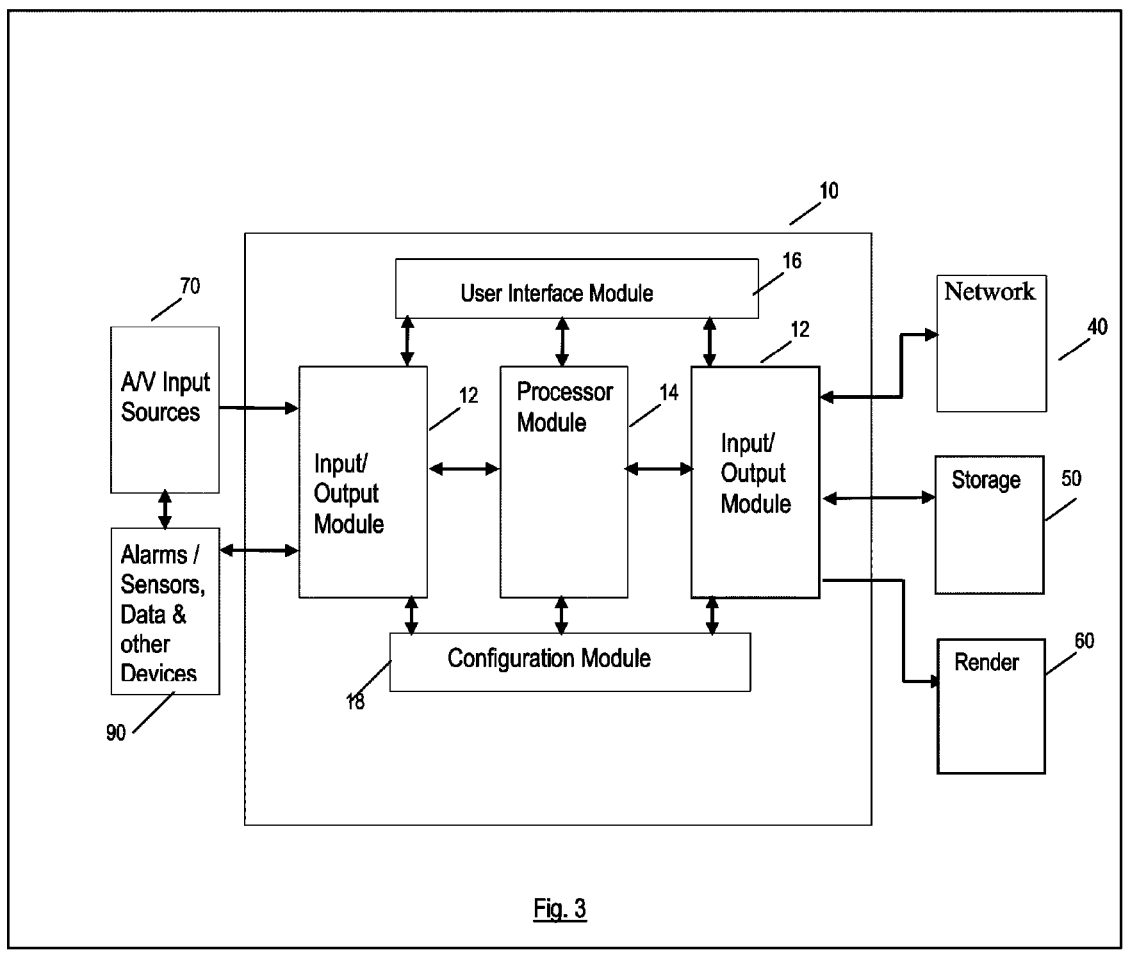
FIG. 3 is a simplified block diagram illustrating one embodiment of the main apparatus of the present invention.

Referring now to the DVCR 10 apparatus in more detail, in one embodiment as shown in FIG. 3, the DVCR 10 comprises of an input/output module 12, processor module 14, a user interface module 16, and a configuration module 18. The input/output (I/O) module 12 receives and transmits data from the I/O devices attached to DVCR 10. The input/output module 12 may transform data appropriately before providing it to the processor module 14 for further processing or after receiving it from the processor module 14 to prepare it for transmission or storage. The processor module 14 functionality includes that of a digital media recorder, player, server, and carrying out other application specific processing. A video and audio analytic engine provides the video and audio analysis functionality of the processor module 14. A license plate recognition (LPR) engine provides the LPR analysis functionality of the processor module 14. The user interface 16 and configuration module 18 allow control and setting-up of DVCR 10 respectively.

As will be further described below, the DVCR 10, as shown in FIG. 3, is used to facilitate the monitoring, controlling, recording and streaming of multimedia data including from a video and audio (A/V) input source 70. The pass-through video of A/V input source 70 displayed by the render unit 60 provides for live-view monitoring. If the A/V input source 70 is an analog pan/tilt/zoom (PTZ) camera, it can be controlled in hardware through a joystick device 90 or in software through user interface 16. The recordings can be stored onto a storage media 50. The storage 50 can be an internal storage built-in to the DVCR 10 (for example, hard disks) or an externally interface storage devices including USB based storage devices. The USB based storage devices can be USB flash drives or hard disks or SATA and IDE hard disks connected through converters such as SATA to USB or IDE to USB. The storage 50 can also be shared network storage (for example, NAS drive). The network 40 usage includes streaming of prerecorded multimedia contents as well as real-time streaming of the input A/V source 70 providing remote live-view monitoring. The network 40 can also be used to remotely control A/V input source (for example a PTZ camera). The DVCR 10 can be configured to playback contents read from the storage 50, or from the network 40. The render unit 60 displays the A/V contents, via the input/output module 12. A DVCR 10 can also receive and record position data from a GPS device 90, for example when installed in a vehicle. Alarm and sensor devices 90 can also be attached and controlled via input/output module 12 of DVCR 10.

Still referring to FIG. 3, the DVCR 10 further includes the user interface module 16 and the configuration module 18. The user interface module 16 may be used to control the operation of the DVCR 10 and is configured to accept input from a user. The input may be through buttons and switches or a remote control device and the likes using mechanical and/or touch technology. One or more buttons can be provided, for example, to start/stop recording; for play/pause; for trick modes (for example, fast forward/rewind, slow motion, reverse play etc.); and for navigation and control (for example, up/down and left/right). One or more buttons may be housed on both the DVCR 10 device and the remote control device or on either one of them. The navigation control usage may include navigating a graphical menu system including in the form of on-screen display (OSD). Furthermore, user interface 16 can be in the form of web interface through which DVCR 10 can be configured, controlled and operated from a remote location via computer 80, referring to FIG. 2. The web interface can be provided via standard browsers or can be proprietary.

Again referring to FIG. 3, the configuration module 18 configures the DVCR 10 including the input/output module 12, the processor module 14 so as to generate the A/V output in the appropriate format for viewing, storage and/or streaming. The configuration of the DVCR 10 includes selection of camera, setting of recording parameters (for example, selection between H.264 or MPEG2 encoder, entering time/date for schedule recording etc.), network settings of DVCR 10 as well as of any attached IP camera (for example, IP, subnet mask and default gateway addresses etc.), storage selection (for example, internal hard disk or external USB drive). The configuration module 18 can also used to search for presence of plurality of DVCR 10 in a network and configure a discovered DVCR 10 to be controlled and operated over the network. In one case, the configuration module 18 receives information, from the user, through the user interface 16. Alternatively, the configuration module 18 may also receive the information from other sources, such as, another DVCR 10 or computer via the network 40.

Referring now to the DVCR 10 in further detail, using FIG. 3, the input/output module 12 may support various video standards, such as, CVBS, S-Video, component Video, RGB, DVI, HDMI, LVDS, ITU-R BT.656, and the likes. Similarly, it may also support various audio standards, such as, PCM, I2S and the likes. The input/output module 12 may also employ plurality of any wired or wireless means like USB, Ethernet, FireWire, Bluetooth, Wi-Fi, or any other suitable interface with associated protocol and standard for data transfer. For example, the A/V input source can be a USB based camera, an IP based camera or a storage device such as USB hard disk or a NAS drive. In one embodiment DVCR 10 can be configured as a switch whereby multiple network ports of input/output module 12 form part of one LAN. The DVCR 10 can also be configured in a router mode whereby plurality of network ports of DVCR 10 can be divided into a WAN port and number of LAN ports where LAN and WAN ports are isolated from each other and network traffic is routed and managed by the processor module 14.

Referring again to the FIG. 3, the input/output module 12 can be configured to receive A/V contents in analog or digital form from the A/V input source 70. The A/V contents may be single-channel or multiple channels. The A/V input source 70 may include any variety of analog and/or digital video camera including an IP camera, a DVD player, a set top box, a VCR, a TV set, or any other such media device. In one embodiment both analog and IP camera can be simultaneously connected to DVCR 10 as A/V input source 70.

In the case of analog A/V contents, such contents are captured by the input/output module 12 and digitized. In the case of digital contents, such contents are passed onto the processor module 14 with minimal required processing.

The processor module 14 receives the input from the input/output module 12. The processor module 14 is configured to encode or transcode the A/V contents received by the input/output module 12 to a desired format. The processor module 14 may be configured to handle any suitable audio and/or video compression method as provided by, for example, MPEG1, MPEG2, MPEG4, H.263, H264, AAC, MP2, MP3, AC-3, G.7xx standards, or any other standard or proprietary compression algorithm as well as any uncompressed audio and/or video format. The processor module 14 may then be configured to multiplex the elementary video and audio streams using any suitable multiplexing scheme, including transport stream (TS), program stream (PS), MP4, AVI, or any other standard or proprietary multiplexing format.

The processor module 14 converts the multimedia contents into a desired format and passes it onto the input/output module 12 for transmission and/or storage. The processed multimedia contents can be stored to the storage 50 associated with the DVCR 10 including internal, external, or shared network storage. The storage 50 may comprise a built-in hard disk, a compact flash, a secure digital (SD) card, a multi-media card, a memory stick, a USB based storage device including flash drive, hard drive, iPod, iPhone, iPad and the likes, a network storage device or any other storage medium. Multiple USB storage devices can be connected to DVCR 10 and used seamlessly, whereby as soon as one USB storage device fills up, the contents start getting stored on the next available USB storage device.

The processor module 14 may also be configured to store the A/V contents in a circular or linear storage mode. In the case of circular mode, on finding that the storage 50 is full it overwrites the oldest file for continual recording. In the case of linear mode, on finding the storage 50 full, the processor module 14 stops further recording if additional storage is not available.

The processor module 14 is further configured to split the A/V recordings into multiple, user specified, size files (for example from 500 MB to 2 GB) for storage. Beside, overcoming the maximum file size limit of a file system being used, splitting of the recording also results in easier management of files. The file splitting is accurately carried out without any video/audio frame loss.

In one embodiment, the processor module 14 of the DVCR 10 may also include a video and audio analytics engine including license plate recognition (LPR) for security and surveillance applications. The other supported analytics include detection of abandoned objects, object removal, abnormal video or audio activity, trip wire, camera tampering, video lost, and motion detection. The analytics can be individually enabled, via the configuration module 18, based on the deployment location of the DVCR 10 and the environment. The environment can be that of indoors or outdoors.

The processor module 14 can be configured to record continuously (continuous mode) or from time to time coupled to an event occurrence (event mode). The event includes a video analytic event, such as motion detection. For example, configured for event recording mode and motion detection video analytic enabled, the processor module 14 starts recording when motion is detected in a region of scene being monitored and stops recording when the event passes. The processor module 14 can also be configured to maintain a predetermined duration of pre-event and post-event history. For example, pre-event of duration 5 seconds and post-event of duration 10 seconds can be set. Hence, when an event occurs the recorded segment consists of the event itself as well as 15 seconds of the pre and post event recording. The history of all event recordings is maintained in a database for the DVCR 10 player's smart search algorithm. The input/output module 12 can also be configured, optionally to send an alert message, in case of an event occurrence, to a pre-defined fixed or mobile device via standard messaging schemes including an e-email, SMS, MMS.

To efficiently manage a large volume storage device of say 2 TeraByte (TB), the recordings are uniformly distributed across number of directories and files and information is kept in a database by the processor module 14. For each A/V file, there is an associated database file which consists of a number of database fields related to the A/V recording. The fields includes the ID field comprising of the UTC time at which an event occurs, where an event type may include file creation, any of the video analytic events (such as motion detection, video lost, camera tempering, video lost, abandoned object and unusual video or audio activity), alarms, external triggers or GPS position data change. Other database fields include event name (type of event), file name (for example UTC time of the file to which the particular event record belongs), file size, file duration, event start time, event end time, file offsets corresponding to key video frames of the A/V recording etc.

The database files help to provide fast random access in locating the desired media file as well as location within the media file itself, for example to locate data with reference to a particular period in time or event. All the database files within a directory are also merged into one large database file. The large database file of every recorded directory can be used to generate sorted list of files on the storage 50 and to create a filtered list of events within a user requested time duration. The database can be one of standard databases such as variants of SQL, Oracle or proprietary.

A storage device failure can occur due to a number of reasons including power failure or similar sudden disruptions. As a result, data corruption could occur in any portion of the storage media; from data area to its file system. Most files systems usually have some redundancy for the critical part of the file system to allow its recovery in the event of corruption. However, in worst case scenario, it is possible that even the redundant information available is not adequate for the task of recovering the file system. In one embodiment, DVCR 10 can be configured to format and manage the storage 50 such that media recordings can be recovered automatically and any data loss is kept to minimum in case of storage device failure, for example due to sudden power failure. The storage media fail-safe scheme of DVCR 10 also tries to minimize the probability of occurrence of data corruption in the file system area.

The formatting and management of storage 50 is carried out in a manner that it remains fully compatible with standard computer file systems (for example FAT, NTFS, HFS+, Ext2 etc.), such that it can be plugged into a computer and files can be played back and administered in off-line mode away from the DVCR 10. The DVCR 10 storage fail-safe scheme will be described here for a FAT 32 file system but can be adapted for other standard or proprietary file systems.

Figure 4:
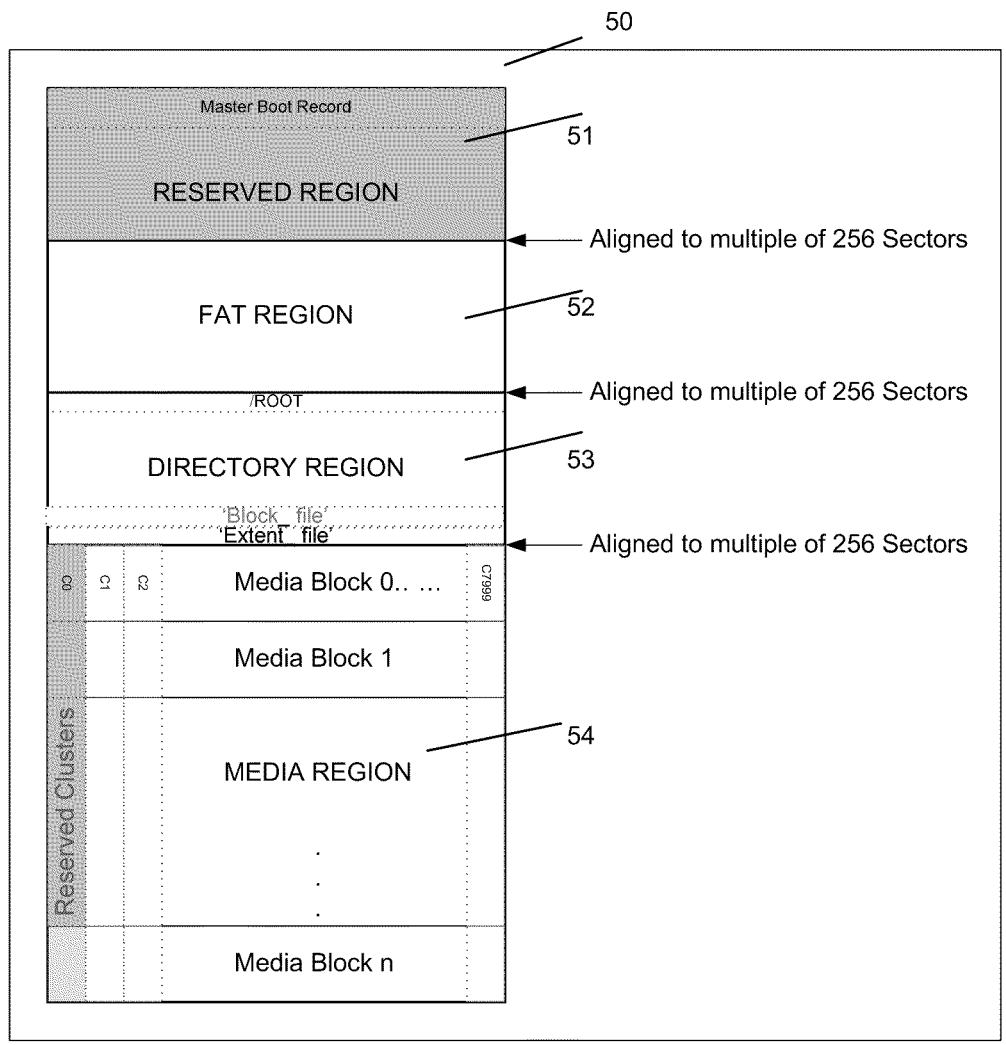
FIG. 4 is a simplified distribution diagram of a storage media illustrating various regions of the storage space.

To keep the size of the file system manageable, the storage 50 is formatted with a sufficient large cluster size (for example 128 sectors, where a sector can be up to 512 bytes). A large cluster size is used also since A/V files tend to be of larger size. FIG. 4 shows a typical storage space distribution diagram of storage 50. The first sector is usually the master boot record, followed by the reserved sector region 51. The FAT region 52 follows next. The data region of storage 50 is divided into two parts; directory region 53 and media region 54. To avoid cache lines crossings the boundaries of these regions are kept 256 sectors aligned, as shown in FIG. 4.

The directory region 53 of the storage 50 contains root directory, sub-directories, as well as DVCR 10 operation related files such as log files, temporary and intermediate files and special files that helps the fail-safe scheme to recover from file system corruption. These special files are not written to; through the standard file system I/O routines but are managed directly by the DVCR 10 fail-safe scheme. Also, the clusters assigned to the special files are updated one sector at a time to minimize chances of corruption. The media region 54 of the storage 50 is only used for storing media recordings and the associated files (for example database files etc).

Still referring to FIG. 4, the media region 54 is further divided into fixed size media blocks (for example of 500 MB sizes, corresponding to 8000 contiguous clusters for a cluster size of 128 sectors). Each media recording can be of one media block size or less and up to four media blocks (2 GB if media block is of 500 MB size). Except for the first cluster of each media block, rest can be used for media recording. First cluster of each media block (for example C0 of media block 0, as shown in FIG. 4), is not used for recording but is a reserved cluster that may contain critical data about the media files recorded in the media blocks of media region 54. Each sector of the reserved cluster may contain information about a media file. The critical data may consist of, for example, file names, directory path information, starting and ending cluster chains, file creation time etc. The first cluster of each media block is assigned to a special file called "block_file", where the block_file is created and resides in the directory region 53. The information stored in the block_file is can be used by the fail-safe scheme in recovering a corrupted file system. Another special file which can be called "extent_file" is also a fixed size file (for example, a cluster chain of 80 clusters (5 MB for a 128 sector/cluster can be assigned to this file from the directory region 53). The extent_file contains information about chain of free contiguous clusters (called extents) in the media region 54. The information is represented by a table of pair of values for each extent where first value provides the first free cluster location of the extent and the second value the size of the extent (number of free contiguous clusters). After formatting of the storage 50, essential formatting information is stored in one of the sectors of the reserved area 51. The information stored can include a storage device ID string, the time of formatting the storage 50, the format geometry of the storage 50 and checksum bytes etc.

The file creation/closing process in the media region 54 is briefly described next. Whenever a file is opened for media recording, it is assigned the first free extent of a media block found in the extent_file for recording. The corresponding reserved cluster/sector of the media block is updated with the information about the new media file opened. The information includes the file name, file directory path, extent(s) allocated, file creation time etc. The file system is also updated for the new file including its directory entry. The file system and block_file information compliment each other and help in recovering one from the other in case of any corruption. To prevent unnecessary access of file system area the directory entry is updated only on opening or closing of files. During the recording the file size and file ID of each opened file is kept in a separate (other then the storage 50) non-volatile memory of DVCR 10 (the non-volatile memory can be a battery back-up memory module or the likes) and file size is updated regularly. The file ID consists of information such that it can be used to reach the starting reserved cluster/sector of the media block corresponding to the file being recorded. The sectors of reserved region 51 of storage 50 can also be used for storing file size and file ID. The use of a separate non-volatile memory minimizes chances of corrupting the directory region of the file system in case of sudden power failure. During recording only extent_file and block_file gets updated as new extents are allocated for storage. When recording is stopped and the file is to be closed, FAT is updated at this time as well as the corresponding directory entry.

When the DVCR 10 powers up again after a power disruption, the storage 50 critical regions are validated using saved checksums and other procedures. If master boot record has been corrupted it can be regenerated since storage 50 is formatted by DVCR 10 configuration module 18, itself at the start. The saved information (file size and file ID) about file(s) being recorded is retrieved from the non-volatile memory or corresponding alternative location such as reserved area 51. If the retrieved information reveals that a file has not been closed properly at the time of power disruption, using the file ID and from block_file the sector where the file information is kept is located. Using the information there, the FAT table and directory entries are updated and the file is closed. At the most, only the last cluster that was being written at the time of power disruption is lost plus contents in the internal buffer of the storage media at the time. The procedure is repeated for all files that are found to have not been closed properly. The consistency between FAT 52 and extent_file for free clusters and also between directory entries and the block_file is carried out. If inconsistencies are found, the full recovery procedure of DVCR 10 fail-safe scheme is invoked. The FAT table 52, directory entries 53 and extent table can be repaired from the redundant information available via the block_file. The block_file consists of scattered reserved clusters one media block apart, of all media blocks of media region 54 and contains critical information about all the files recorded in the media region replicating the file system contents. In the case of block file, at maximum only one cluster can get corrupted during power failure or similar circumstances. Using the file size and file ID information it can be repaired from the directory entries 53, FAT table 52 and extent_file.

In one embodiment, the DVCR 10 is a standalone media player. The A/V bit-stream is read by the input/output module 12 from the storage 50 or network 40, passed onto the processor module 14 for decoding and the input/output module 12 outputs to the render unit 60 for viewing. The player facilitates trick modes during playback, that include pause, reverse play, fast forward, rewind and slow motion at various speeds. It may be noted, that all the trick modes are also available, over the network, while playing A/V recordings from the storage 50 of the remote DVCR 10.

In one embodiment, the player treats the entire recordings on the storage 50 of the local or the remote DVCR 10 as a virtual tape, where multiple digital files of the play list are played seamlessly, one after the other, starting with the last recorded file. In this mode, the DVCR 10 can be likened to operate like an analog VCR, and hence the apparatus is referred to as Digital VCR (DVCR).

During the playback of recorded files, a segment of interest can also be extracted by the processor module 14 and saved as a separate file. The segmented files can be played back in the same way as recorded files along with all the trick modes.

The trick modes help in viewing a specific portion of a recording. The DVCR 10 player also includes a search and retrieval function to locate a selected recordings associated with an event or a group of events within a specified time period. A particular entry from the displayed list can then be selected for viewing. A temporal search feature of the player provides flexibility to start playing from the desired time of interest.

In one embodiment, the DVCR 10 is a streaming media server. It can stream pre-recorded A/V contents or the A/V source 70 in real-time (live stream). For the live streaming, the A/V source is first digitized (if required), encoded, multiplexed and then suitably encapsulated for streaming in real-time. In another embodiment, DVCR 10 can be configured to simultaneously record and stream multimedia data. The protocols used for streaming includes HTTP, RTSP, RTMP, TS over UDP and/or TCP or any standard or proprietary communication protocol. The stream can be transmitted point-to-point, unicasted, broadcasted or multicasted.

The DVCR 10 can be configured to stream to a specified IP address and port number using the connectionless protocol UDP. The stream can be received by any machine on a network for viewing it (with compatible media player such as VLC) or further streaming it. A machine running a media server such as Wowza media server and receiving the DVCR stream can further stream it to multiple clients. In another embodiment, the DVCR 10 can stream on demand, the pre-recorded or live stream to any compatible client over the network. Any standard web browser with appropriate plug-in components can receive and play a DVCR stream.

In one embodiment, DVCR 10 can support both analog and IP cameras simultaneously as A/V source 70. The user can switch between the analog and IP camera and operate them via the user interface 16 of DVCR 10. The IP camera, while attached to DVCR 10, can also be accessed by its own web application over the network 40 in a transparent manner. The two A/V sources (analog and IP camera) can also be controlled and operated over the network 40 by user interface 16 of another DVCR 10 or a computer through a web interface.

Referring back to FIG. 1, the DVCR 10 can be configured to scan the network for other DVCR 10 units. A list of discovered DVCRs is displayed. Each DVCR 10 can access, after authentication (user name, password), any of the listed DVCR 10 for configuration, monitoring, controlling, recording, playback and other available functionality. The same controls used for operating a local DVCR 10, including use of buttons of a local DVCR 10, can be employed to operate the remote DVCR 10, giving a virtual presence at the remote location.

Figures 5, 6:
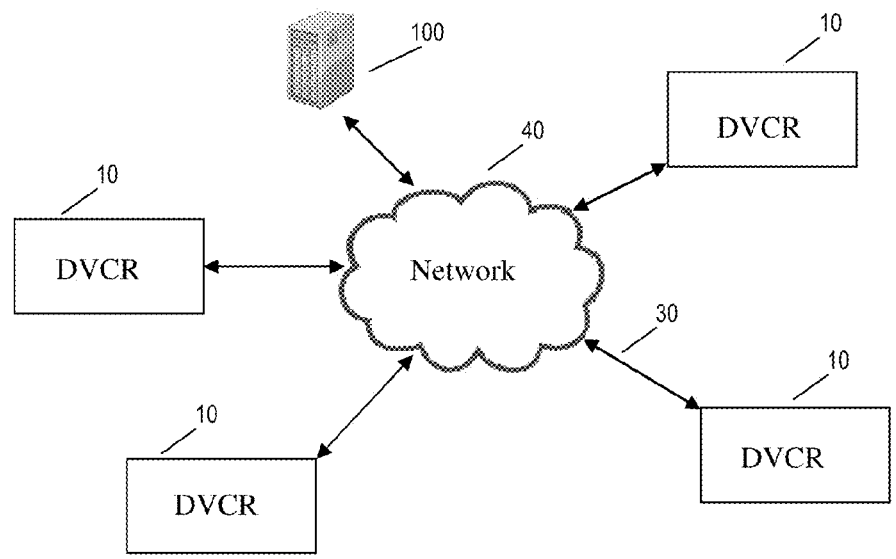
FIG. 5 is a simplified table illustrating list of DVCRs discovered on a network along with their status.
FIG. 6 is a simplified diagram illustrating network of DVCRs and location server.
Figure 7A:
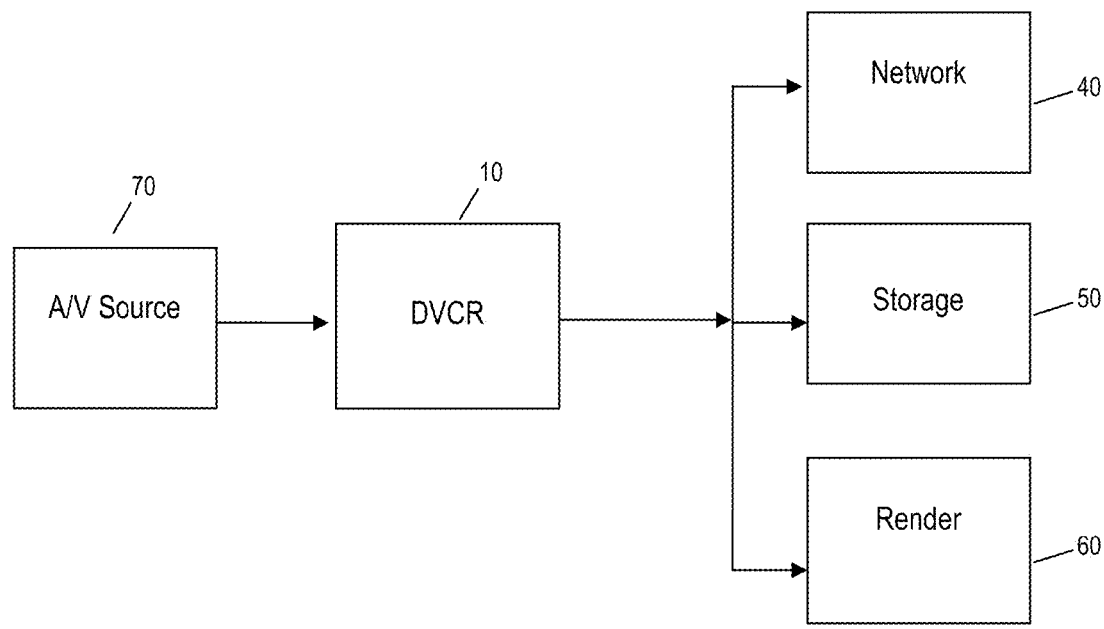
FIGS. 7-11 are simplified block diagrams illustrating various use scenarios according to different configurations of the present invention.
Figure 7B:
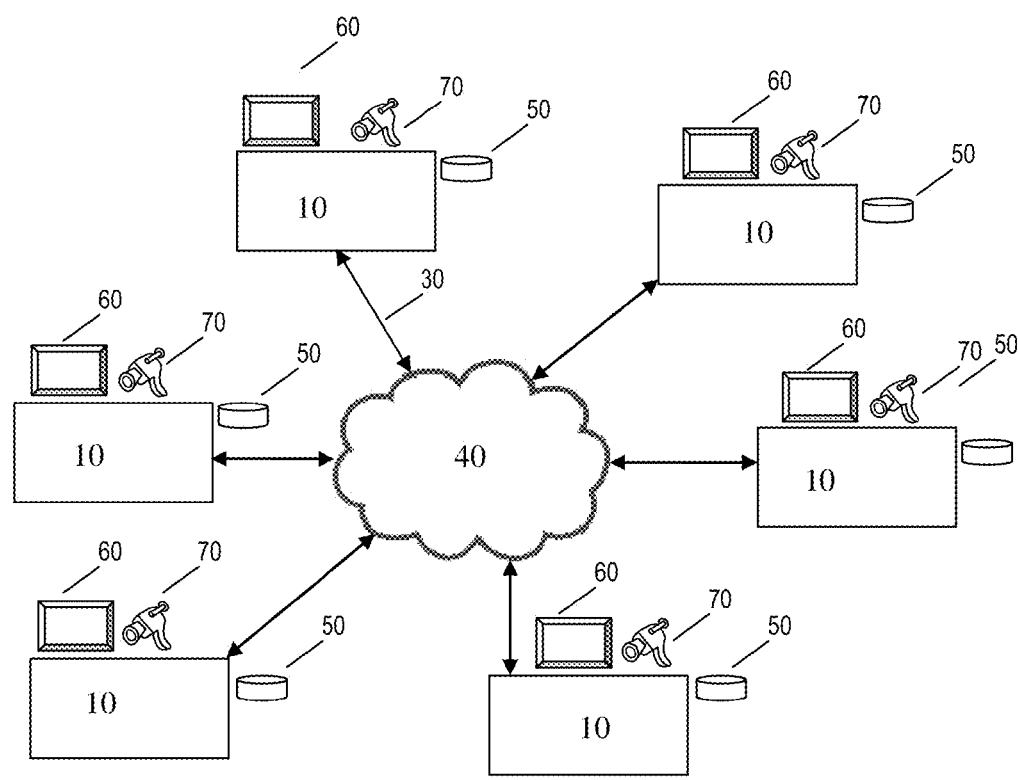

Still referring to FIG. 1, in one embodiment, a UDP based messaging scheme is used to discover plurality of DVCR 10 present on the network 40, where the network 40 is a LAN. A client DVCR 10 wishing to access and control one or more remote DVCR 10 initiates the scanning process by broadcasting a request message on a port, the port being configurable (for example 200). This same port number (200) is being listened to by all the DVCR 10 on the network 40, each running a UDP server. The request message of the client DVCR 10 begins with a marker string followed by a random number, for example "dvcrNetshare98", where number 98 is assumed here to be the random number. The random number, obtained from a random number generator, acts as a unique request ID and is used for binding with a remote DVCR 10. On receiving the request message from the client (local) DVCR 10, each server (remote) DVCR 10 prepares a response message, with information about itself. The response message can be in xml format or the likes. The information about the server DVCR 10 includes its assigned name, unique Web ID which can be its Ethernet MAC address, Web port number (on which its web server is running) and the current state of its operation. The response message packet along with the request ID is sent by all servers DVCR 10 to the designated port of the client DVCR 10. The client DVCR 10 after broadcasting the request message starts listening on this port to collect reply messages from all the DVCR 10 currently on the network 40. The request ID helps in ignoring any delayed and hence duplicate replies from server DVCR 10 by the client DVCR 10 due to network constraints or unsolicited replies from any other DVCR 10 on the network 40. The client DVCR 10 forms a list of the discovered server DVCR 10 and the list is also sent to the user interface 16 for display as illustrated in FIG. 5.

The client DVCR 10 periodically (for example at 2 second intervals) posts the request message, on the network 40, and collects the responses to keep the list of server DVCR 10 updated. Every new DVCR 10 discovered is displayed at the bottom of the list. A DVCR 10 is removed from the list if it does not reply to the request message after a certain number of attempts (for example 2). The client DVCR 10 keeps track of the replies from server DVCR 10 in UTC time format. The server DVCR 10 on the network 40 also keeps the client DVCR 10 informed of any status change by sending the response message unilaterally. The client DVCR 10 keeps refreshing the status field of the displayed list. Some of the states of a DVCR 10 can be 'Idle', 'Recording', 'Streaming', 'Connected', 'In use' etc. Any DVCR 10, on the network 40, in idle state can be safely accessed by a client DVCR 10 for control and operation.

To prevent unauthorized access, each DVCR 10 on the network 40 can be configured to require an access code for login, for example a user name and password. After the successful authentication step, a full duplex communication channel is established between the local (client) DVCR 10 and a remote (server) DVCR 10. The client DVCR 10 requests the configuration parameters of the remote DVCR 10. The client DVCR 10 configuration module 18 saves its own configuration parameters and loads the configuration parameters of the remote DVCR 10. The user interface 16 of the client DVCR 10 now shows the settings of the remote DVCR 10. The user interface module 16 of the client DVCR 10 such as the buttons, switches, graphical navigation controls etc. can now be used to control and operate the remote DVCR 10. The client DVCR 10 constructs appropriate command requests corresponding to the input received via the user interface 16 and sends these over the established communication channel to the remote DVCR 10. The remote DVCR 10 receives the commands, executes them and prepares appropriate response message including any data for sending back to the client DVCR 10 on the same communication channel. The client DVCR 10 interprets the response, does any data processing required through its processor module 14 and updates the render module 60 and/or any other output device accordingly. For example, pressing a record button of user interface 16 of the local DVCR 10 prepares and sends a control command message to the remote DVCR 10 to start recording to its local storage 50. A state change to 'Recording' state is conveyed by the remote DVCR 10 to the client DVCR 10 which can be displayed by the local render unit 60. The underlying procedure for operating the remote DVCR 10 via the local DVCR 10 is through remote procedure call (RPC) mechanism. While the connection between client and remote DVCR 10 remains established, the client DVCR 10 sets its state to 'In use' for the knowledge of other DVCR 10 on the network 40. During no activity period, the client DVCR 10 periodically sends 'keep alive' messages to which remote DVCR 10 responds. If remote DVCR 10 does not receive a 'keep alive' message for more than a configured time factor (for example 2 seconds), the remote (server) DVCR 10 closes down the communication channel.

Each DVCR 10 runs a network file input/output (I/O) driver with built-in cache management to optimally perform file I/O operation over the network 40. To enable playback of files from the storage 50 of remote DVCR 10, the local DVCR 10 loads the database of the remote DVCR 10 through the network driver and displays the file list for selection via the user interface 16. The selected file is opened and the contents are streamed over the network 40 in compressed form. The decoding of the compressed stream is carried out by the processor module 14 of the local DVCR 10 and result displayed via the render module 60. The remote DVCR 10 can also be configured for recording to its local storage 50 in a transparent manner from the client DVCR 10 through the network driver while the database files associated with the recordings is updated and kept at the remote DVCR 10 end.

The remote location can be monitored (live feed from the remote A/V input source 70, for example an analog or IP camera) at the same time while the remote DVCR 10 is recording to its local storage 50. The streaming server running on the remote DVCR 10 while giving priority to the recording, optimally manages the network delays and bandwidth using intelligent bit-rate adaptation to make the simultaneous recording (at the remote DVCR 10 end) and remote viewing possible (at the client DVCR 10 end). If the camera is a PTZ camera, it can also be controlled over the network 40 using user interface 16 of the local DVCR 10.

To access and operate a remote DVCR 10 over the internet (WAN) only the discovery step and updating of the list of the discovered DVCRs differ, from the case where the network 40 is a local area network (LAN). All other mechanism for operating a remote DVCR 10 over the internet remains the same as that of LAN case, described above. A DVCR 10 can be configured through its configuration module 18 to be accessible over the internet. With internet configuration enabled, DVCR 10 periodically sends its identification to a location server 100 located on the internet as shown in FIG. 6. The IP address and port number of the location server 100 is known to the DVCR 10 configured to be accessible over the internet. The identification information of a DVCR 10 includes its unique Web ID which can be its Ethernet MAC address, its internet (WAN) IP address, its web server port number and the state in which it was operating at the time. This enables the location server 100 to maintain a database of active DVCR 10 on the internet. The location server 100 can further categorize the active DVCR list into groups. A DVCR 10 can only be accessed remotely by another DVCR 10 over the internet, if it belongs to the same group. For example a set of DVCR 10 at different geographical locations operated by a 7-eleven store owner will not be accessible to the set of DVCR 10 belonging to a MacDonald's franchise.

In the case of internet, a client DVCR 10 discovers the presence of remote DVCR 10 directly by downloading the information from the location server 100. The authentication mechanism at the location server 100 ensures that only those remote DVCRs become visible to the client DVCR 10 which belongs to its group. The client DVCR 10 periodically polls the location server 100 to keep the list of discovered DVCRs updated. Once the client DVCR 10 receives the information (WAN IP address, web server port number and status) about remote DVCR 10, the process of operating it over the internet is same as in the case of LAN described earlier.

The functionality exhibited by each of the DVCR 10, is identical. A plurality of the DVCR 10 can thus form a decentralized, symmetric network in which there is no master or central controller. Each DVCR 10 is an autonomous device able to operate in its local environment as well as access and operate another DVCR 10 available on the network to facilitate the overall working of the disclosed system.

Referring, now again to FIG. 2, a general purpose computer 80 can also access any of the remote DVCR 10 via standard web browsers or a proprietary software application. It can manage, control and use some or all of the features or functions of the DVCR 10. For example, DVCR 10 file management including renaming, deletion and downloading; start and stop recording; view prerecorded files or simply monitor the remote surveillance area. If the camera attached to the DVCR 10 supports PTZ, the surveillance area can be monitored accordingly over the network 40. A graphical user interface enables convenient control of the pan/tilt/zoom of the camera. The web interface of DVCR 10 also provides a graphical mode for extracting segments of recorded files as well as search and jump to time features. The jump to time feature enables user to traverse the time by weeks, days, hours and locate the file suitably for playback.

Different embodiments described of the DVCR 10 may contain features like dynamic source detection, whereby the selection of the appropriate A/V input source is made dynamically on the basis of the availability of the A/V signal; dynamic video standard detection, whereby the selection of NTSC/PAL/SECAM video standards is made automatically;

and automatic storage media detection, whereby the type and make of media storage device is detected automatically.

Different embodiments of the DVCR described may also provide support for FAT32, FAT16, HFS, HFS+, Ext2, Ext3, NTFS, or any other standard or proprietary file system.

The DVCR 10 of the present invention may be deployed in various configurations and situations, as depicted in FIGS. 7-11. The DVCR 10 configuration shown in FIG. 7a has the input A/V source 70 attached; the render unit 60 and has the storage 50. The FIG. 7b shows depiction of such DVCRs interconnected via the network 40. Each DVCR is identically equipped. The user need not be present at one particular location. All DVCRs can be accessed and controlled in the same way from any of the locations.

Figure 8A:
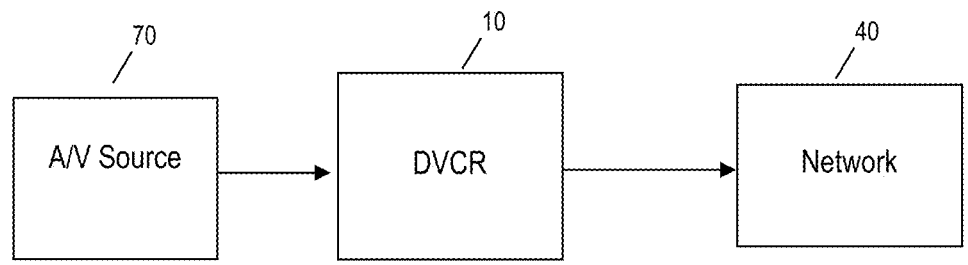
Figure 8B:
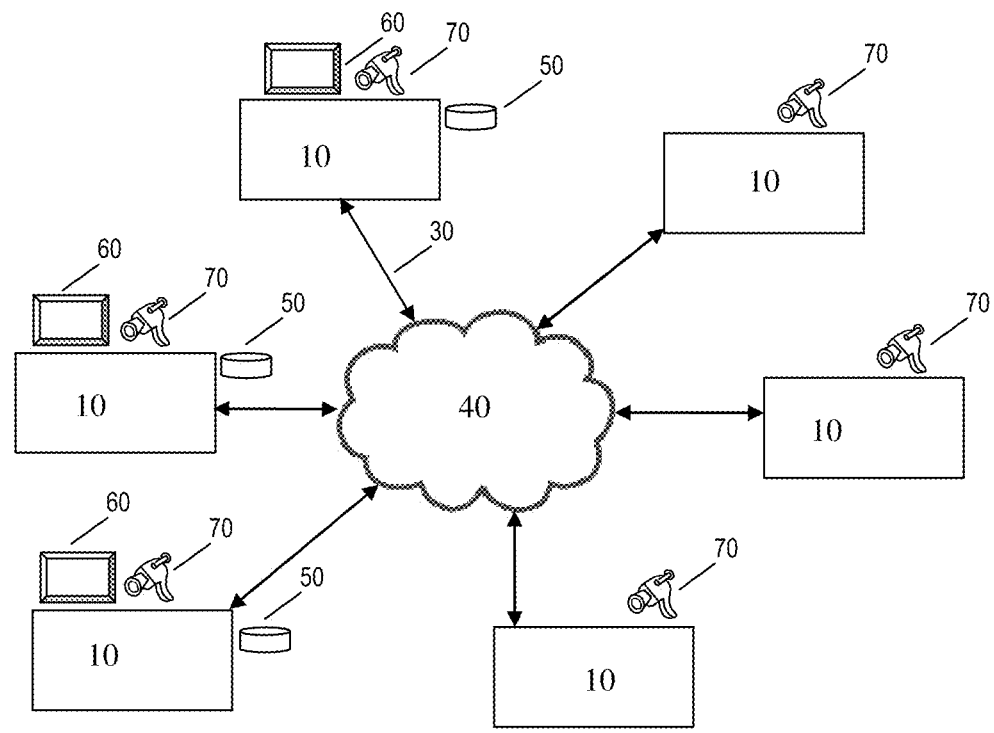

The DVCR 10 configuration as shown in FIG. 8a can be used at locations which need only monitoring. Such a configuration does not require any storage 50 or render unit 60, bringing down the system cost. The FIG. 8b shows a network of DVCRs where some DVCR 10 are configured as in FIG. 8a.

Figure 9A:
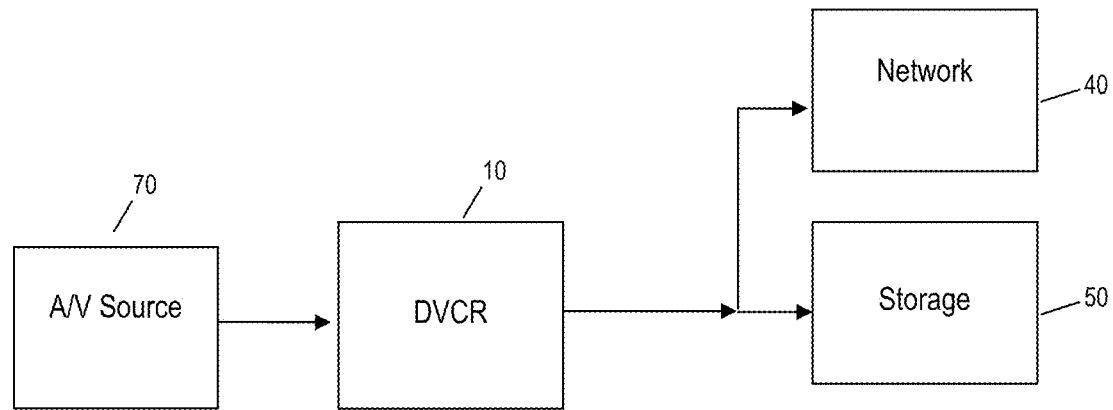
Figure 9B:
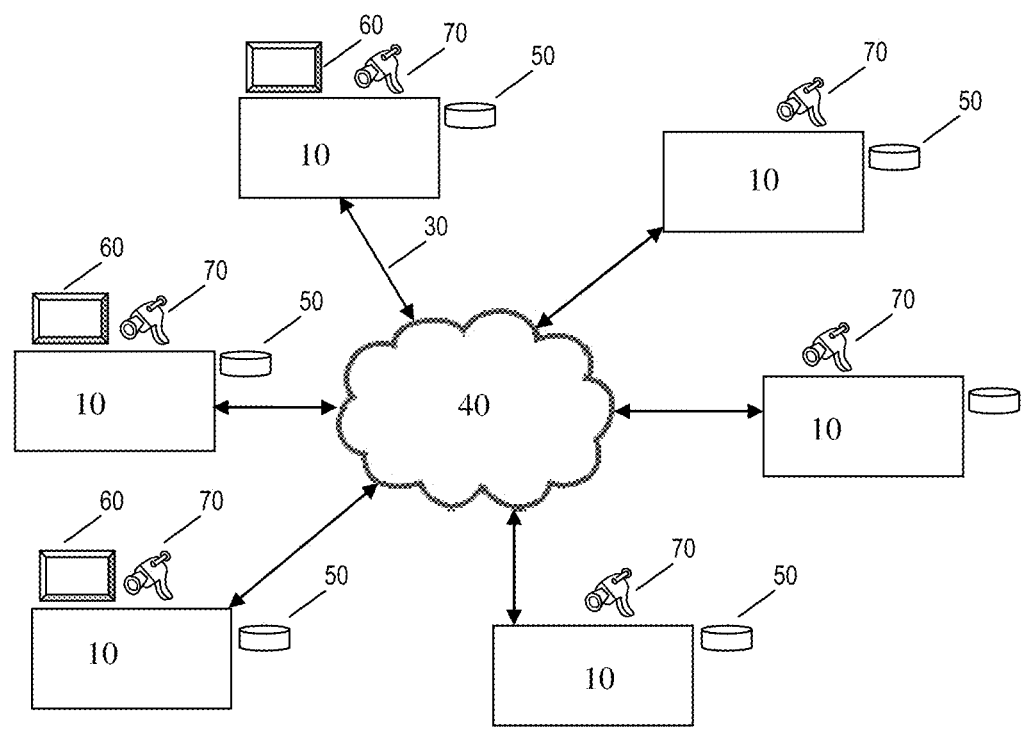

The DVCR 10 configuration as shown in FIG. 9a can be used at locations which require monitoring and recording. Such a configuration does not require any render unit 60. The FIG. 9b shows a network of DVCRs where some DVCR 10 are configured as in FIG. 9a.

Figure 10A:
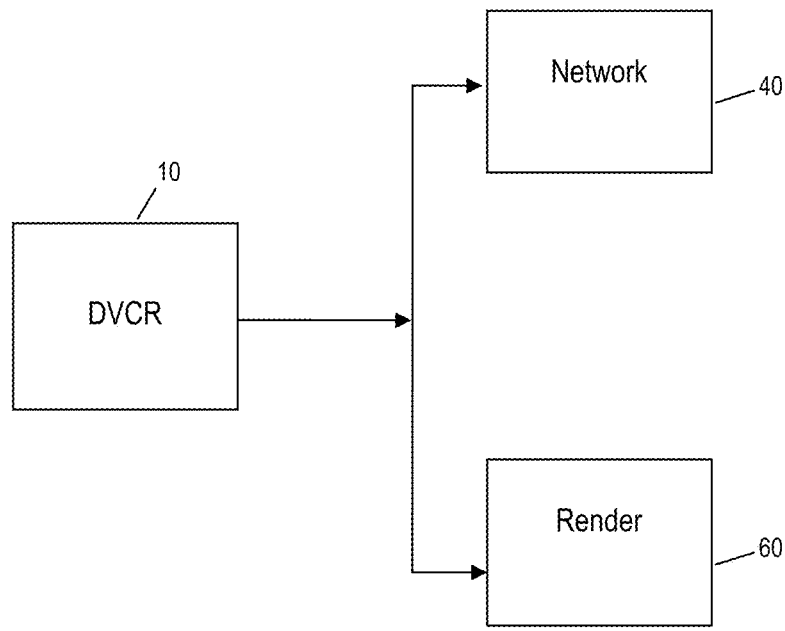
Figure 10B:
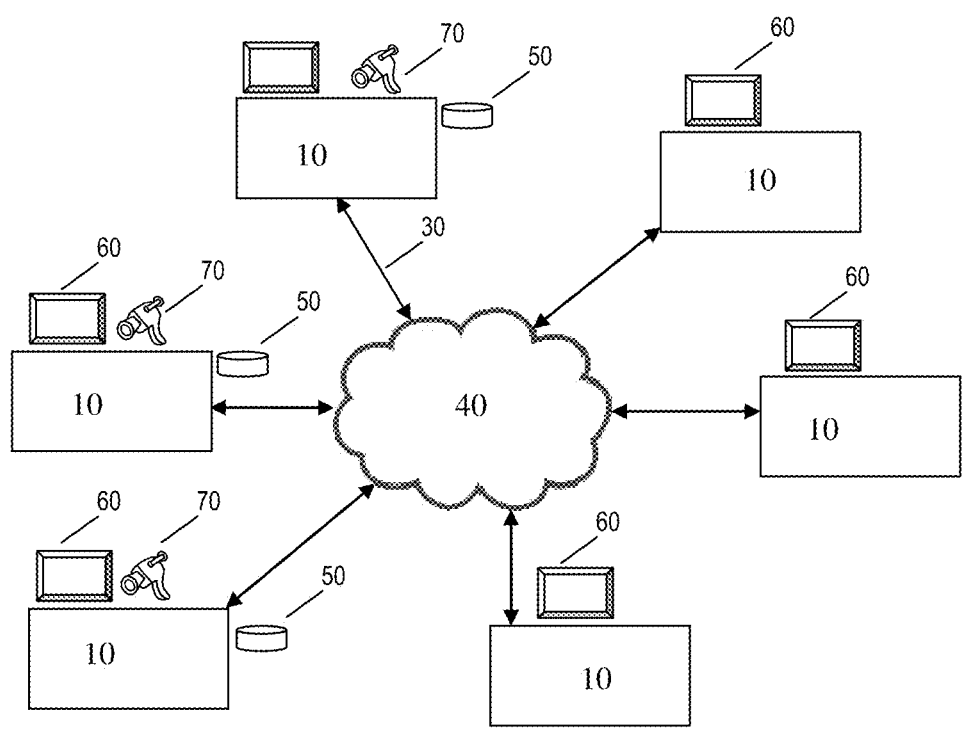

The DVCR 10 configuration as shown in FIG. 10a, with render unit 60 only, can be used for remote monitoring and controlling the remote DVCRs. Such a configuration does not require any A/V source 70 or storage 50. The FIG. 10b shows a network of DVCRs where some DVCR 10 are configured as in FIG. 10a.

Figure 11A:
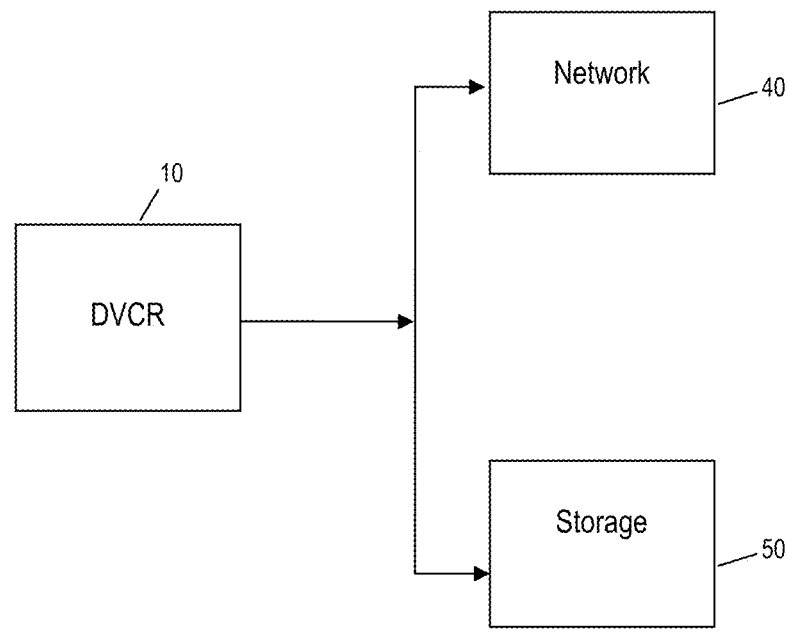
Figure 11B:
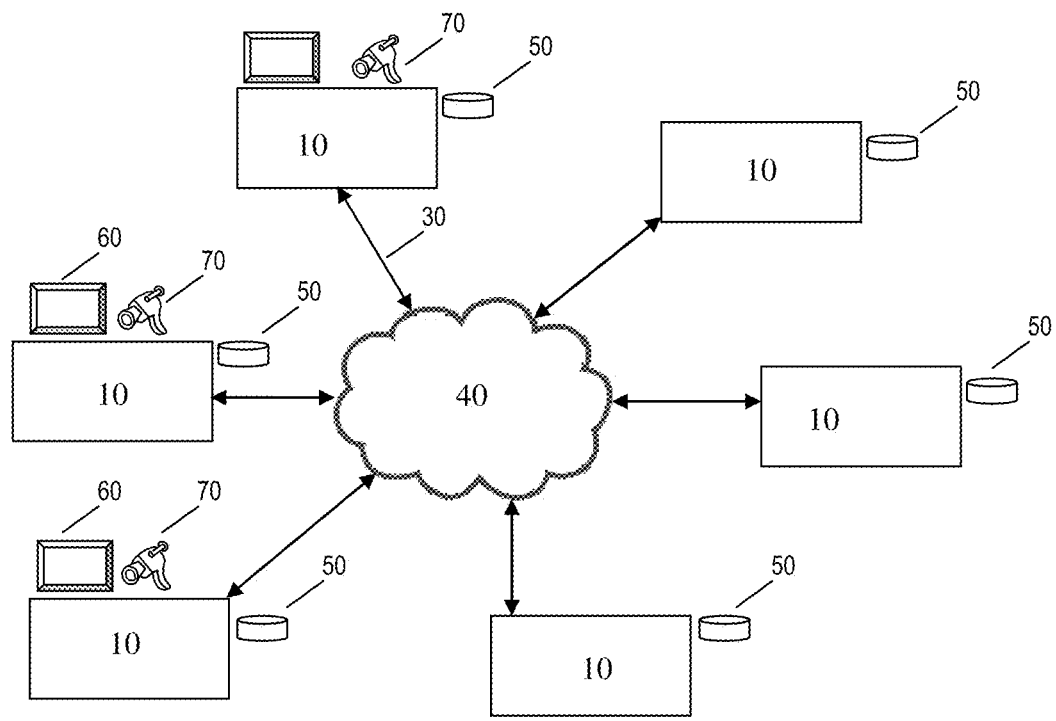

The DVCR 10 configuration as shown in FIG. 11a, with storage unit 50 only, can be used as a media streaming server. Such a configuration does not require any A/V source 70 or render unit 60. The FIG. 11b shows a network of DVCRs where some DVCR 10 are configured as in FIG. 11a.

In another embodiment, the DVCR 10 can receive multiple streams from a number of remote DVCRs and display them suitably for viewing after processing. For example 4 remote DVCR surveillance areas can be viewed on a display unit in a 2×2 quadrant.

In another embodiment, two or more DVCR 10 can receive A/V stream from the same remote DVCR. For example in a training session students can watch instructor's technique.

The symmetry and decentralized characteristic of the disclosed system brings deployment advantages. A DVCR 10 node can be added or removed without affecting the working of existing network. Incremental expansion to the existing network is accomplished in a simple manner. The system can be easily installed and managed, requiring no special skills or dedicated personal. The DVCR 10 can be moved conveniently from one location to another, requiring a simple plug-in to the existing network. It can be placed indoors or outdoors. Examples of locations where the disclosed surveillance system can be installed include franchises, departmental stores, media server rooms, block of apartments, homes and offices, vehicles, road crossings, etc.

The functional similarity of the disclosed apparatus brings ease of use advantage of the present invention. Since, the DVCR 10 devices are all alike, it is only necessary to be familiar with one such apparatus to be able to manage the system as a whole. A DVCR 10 can be operated locally as effectively as it can be from a remote location.

Yet, another advantage of the present invention is its location free or virtual presence feature. The extensive networking capability of the DVCR 10 makes it immaterial for the user to be necessarily present at any particular location to control other DVCRs.

While the foregoing written description of the invention enables one of ordinary skill to make and use what is considered presently to be the best mode thereof, those of ordinary skill will understand and appreciate the existence of variations, combinations, and equivalents of the specific embodiment, method, and examples herein. The invention should therefore not be limited by the above described embodiment, method, and examples, but by all embodiments and methods within the scope and spirit of the invention.

The invention claimed is:

1. An autonomous digital video recording apparatus comprising:
    means for a user interface to control and operate the autonomous digital video recording apparatus, for example via front panel buttons or remote control;
    means for an input/output module to interface with external devices, such as analog and IP cameras, that may be connected to the autonomous digital video recording apparatus;
    means for a configuration module to configure the digital video recorder for operating in various modes, including automatically detecting other digital video recorders in a network and providing capability to remotely configure the other digital video recorders; and
    means for a processor module coupled to the user interface, the input/output module and the configuration module to provide the autonomous digital video recording apparatus the functionality of a standalone local digital video recorder to perform live monitoring, controlling, analyzing, recording, playback, and streaming of multimedia data in a local environment through its front panel controls, or to remotely access and operate, through the same front panel controls, a remote digital video recorder, from plurality of digital video recorders, detected on the network for operation in a networked environment.

2. The autonomous digital video recording apparatus of claim 1, wherein the autonomous digital video recorder can support as A/V input source both an IP camera and an analog camera simultaneously such that through a single user interface the two cameras can be accessed and controlled either locally or remotely over a network.

3. A method of forming and operating a decentralized symmetric network of autonomous digital video recorders, the method comprising:
    using network enabled autonomous digital video recorder;
    interconnecting plurality of network enabled autonomous digital video recorder, in a wired or wireless manner, thereby forming a network of autonomous digital video recorders; and
    wherein, functionality exhibited by each autonomous digital video recorder in the network is identical, whereby plurality of such autonomous digital video recorders form a decentralized symmetric network of autonomous digital video recorders having no master and slave nodes; and
    providing means for the communication between the plurality of autonomous digital video recorders forming the decentralized symmetric network of autonomous digital video recorders such that any of the autonomous digital video recorder in the network can remotely control and operate of any of the plurality of other autonomous digital video recorders without any central controller.

4. The method of claim 3, wherein the same autonomous digital video recorder is capable of operating both in a local and a remote environment, wherein, when operating in a remote environment, the local autonomous digital video recorder can access and operate a remote autonomous digital video recorder that networked with the local autonomous digital video recorder thereby being able to monitor a remote location.

5. The method of claim 3, wherein the autonomous digital video recorder operating in its local environment further comprises:
- configured to scan the network for discovering presence of plurality of remote autonomous digital video recorders;
- selecting an autonomous digital video recorder from the list of plurality of discovered remote autonomous digital video recorders;
- login in to the remote autonomous digital video recorder and establishing a duplex communication channel between the local and remote autonomous digital video recorder;
- saving the local configuration parameters and reading and loading the configuration parameters of the remote autonomous digital video recorder to be able to emulate the remote autonomous digital video recorder;
- getting input from the user interface module, for example via front panel buttons, of the local autonomous digital video recorder and forming a request packet corresponding to the input, and sending over the communication channel to the remote autonomous digital video recorder;
- receiving the response along with any data from the remote autonomous digital video recorder as a consequence of action taken by the remote autonomous digital video recorder on receiving the request packet from the local autonomous digital video recorder; and
- interpreting the received response and acting accordingly including processing of any data for displaying.

6. The method of claim 3, wherein each of the plurality of autonomous digital video recorder in the decentralized symmetric network of autonomous digital video recorders is capable of emulating any of the other autonomous digital video recorder on the network from any location, thereby providing a location free or virtual presence environment.

7. The method of claim 3, wherein the autonomous digital video recorder operating in its local environment can playback media files from the storage device of any of the plurality of remote autonomous digital video recorder by streaming over the network, wherein the method of streaming further comprising:
- using the network tile input/output driver running on each autonomous digital video recorder;
- loading the database of the remote autonomous digital video recorder through the network driver;
- displaying the file list for selection via the local autonomous digital video recorder user interface, for example the front panel buttons;
- opening the selected file at the remote autonomous digital video recorder end and streaming the media contents in compressed form over the network;
- decoding the compressed media stream and displaying it at the local autonomous digital video recorder end; and
- invoking trick modes such as pause, play, fast forward, reverse play during streaming over the network to control the playback of the media file.

8. The method of claim 7, wherein the autonomous remote digital video recorder is configured to record to its local storage controlled by the local autonomous digital video recorder through use of a network driver, wherein, the database files associated with the recordings are updated and kept at the remote autonomous digital video recorder end.

9. The method of claim 3, further comprising:
- live monitoring of a remote location by running a streaming server on the remote autonomous digital video recorder while simultaneously allowing the remote autonomous digital video recorder to record to its local storage; and
- running the streamline server on the remote autonomous digital video recorder optimally and managing the network delays and bandwidth using intelligent bit-rate adaptation to make the simultaneous recording and live streaming possible.

10. The method of claim 3, wherein two or more autonomous digital video recorders can simultaneously receive A/V stream from a remote autonomous digital video recorder.

* * * * *